US007982955B2

(12) United States Patent
Miller

(10) Patent No.: US 7,982,955 B2
(45) Date of Patent: Jul. 19, 2011

(54) BIREFRINGENT FILTER USING REFLECTIVE POLARIZERS AND DICHROIC ELEMENTS

(75) Inventor: Peter Miller, Cambridge, MA (US)

(73) Assignee: Cambridge Research & Instrumentation, Inc., Woburn, MA (US)

( * ) Notice: Subject to any disclaimer, the term of this patent is extended or adjusted under 35 U.S.C. 154(b) by 93 days.

(21) Appl. No.: 11/986,257

(22) Filed: Nov. 20, 2007

(65) Prior Publication Data

US 2009/0128909 A1    May 21, 2009

(51) Int. Cl.
    *G02B 27/28* (2006.01)
(52) U.S. Cl. .......... 359/489.15; 359/489.19; 359/487.01
(58) Field of Classification Search .................. None
    See application file for complete search history.

(56) References Cited

U.S. PATENT DOCUMENTS

| 4,129,357 A | 12/1978 | Frosch et al. | |
| 5,243,455 A * | 9/1993 | Johnson et al. | 349/18 |
| 2007/0070260 A1 | 3/2007 | Wang | |
| 2007/0139772 A1 * | 6/2007 | Wang | 359/497 |
| 2008/0144177 A1 * | 6/2008 | Miller | 359/498 |
| 2008/0151371 A1 * | 6/2008 | Weber et al. | 359/487 |

FOREIGN PATENT DOCUMENTS

EP    0 895 116    2/1999

OTHER PUBLICATIONS

Harris S. E. et al., "Optical Network Synthesis using Birefringent Crystals. I. Synthesis of Lossless Networks of Equal-Length Crystals", Journal of the Optical Society of America, vol. 54, No. 10, 1964, pp. 1267-1279.

* cited by examiner

*Primary Examiner* — Lee Fineman
(74) *Attorney, Agent, or Firm* — Cohen Pontani Lieberman & Pavane LLP

(57) ABSTRACT

An optical filter uses two or more reflective polarizers together with retarders to form birefringent filters with controlled transmission. The energy reflected by these polarizers is absorbed by one or more dichroic elements, which can be adjacent to a reflective polarizer; or spaced apart from it by one or more retarder elements. These dichroic elements act as dampers, so the energy of rays undergoing multiple reflections is markedly reduced or virtually eliminated, and high image quality is maintained. This provides a filter arrangement with enhanced spectral range, image quality, or greater extinction, or lower cost, compared to filters using dichroic or prism-type polarizers.

14 Claims, 9 Drawing Sheets

BIREFRINGENT FILTER USING REFLECTIVE POLARIZERS AND DICHROIC ELEMENTS

BACKGROUND OF THE INVENTION

1. Field of the Invention

The present invention relates to an optical filter having two or more reflective polarizers which form birefringent filters with retarders, wherein the energy reflected by the polarizers is absorbed by one or more dichroic elements.

2. Description of the Related Art

Birefringent filters exploit the phenomenon of polarized-light interference. A filter consists of one or more filter stages in optical series, each of which has a retarder, or a network of retarders, which receives light in a known state of polarization and imparts to it a spectrally varying state of polarization; followed by a polarizer which analyzes the light and selects a chosen state of polarization, having a selected spectral response. The polarizer from each stage acts as an entrance polarizer to the next, so an N stage filter has a total of N polarizers, plus one more for an input polarizer if the input light is unpolarized.

Techniques for synthesis of birefringent filters have been described in the literature, as for example in "Optical Network Synthesis Using Birefringent Crystals. I. Synthesis of Lossless Networks of Equal-Length Crystals", 54 J. Opt. Soc. Am. 1267 (1964), by S. E. Harris, E. O. Amman, I. C. Chang; "Optical Network Synthesis Using Birefringent Crystals. III. Some General Properties of Lossless Birefringent Networks", 56 J. Opt. Soc. Am. 943 (1966), by E. O. Amman; "Optical Network Synthesis Using Birefringent Crystals. IV. Synthesis of Lossless Double-Pass Networks", 56 J. Opt. Soc. Am. (7), 952 (1966), by E. O. Amman; and "Synthesis of Optical Birefringent Networks", Progress in Optics IX 1971, pp. 123-177 (North-Holland, Amsterdam) by E. O. Amman.

Title describes a birefringent filter in U.S. Pat. No. 4,129,357 which differs from Lyot's design in that it uses partially polarizing elements and achieves reduced spectral sidebands compared to a filter that uses perfect polarizers.

Kaye describes a birefringent filter in U.S. Pat. No. 4,394,069 according to Lyot's design, implemented using liquid crystal retarder elements.

Miller teaches the use of liquid crystal elements together with fixed retarders in U.S. Pat. Nos. 4,848,877 and 5,247,378 to form precision tunable birefringent filters. These produce a filter action whose spectral response can be changed electronically.

Birefringent filters have been constructed for use in the visible, the infrared, and the ultraviolet range, with the range of wavelengths being limited primarily by the availability of suitable materials.

Most implementations of the birefringent filter use dichroic sheet polarizer film such as so-called "Polaroid" film as a polarizer. Such polarizers are compact and economical, but have limited spectral range. For example, visible dichroic sheet polarizer does not typically work well in the infrared, where it has limited contrast; or material which has greater contrast in the infrared has reduced transmission in the visible.

Birefringent filters have also been constructed for use in the near-infrared range, using infrared dichroic sheet materials, which are optically lossy; or using dichroic glass material sold by Corning under the trade name Polarcor (Corning, N.Y.). A similar material is offered by Codixx (Barleben, Germany) under the trade name ColorPol. The dichroic glass materials have limited spectral range, outside of which they lose dichroism; also, at short wavelengths they exhibit reduced transmission. Polarizers of this type are much more costly than dichroic film, especially when large aperture is required.

Birefringent filters have been constructed using Wollaston or Rochon prism polarizers. Since these elements are approximately cubic in shape, such a filter is long in the dimension along the optical axis if several polarizers are needed; beyond being bulky, this also limits field-of-view. Such a filter is quite costly and somewhat fragile.

Polarizers have been developed which exploit anisotropic patterned metal films, microscopic in scale, which are sometimes termed wire-grid polarizers. Unlike dichroic sheet or glass, these work by selective reflection so one state of polarization is preferentially transmitted, and the other is preferentially reflected. They are compact, have high contrast and are offered in several spectral ranges. Moxtek (Orem, Utah) offers material of this type under the trade name ProFlux.

Tunable birefringent filters are used together with imaging detectors and control electronics to form multispectral imaging systems. For example, such a system can be made by placing a filter in the beam of an imaging system, prior to the detector; relay lenses may be used to provide a convenient place for the filter in the optical path. One example of such a system is the Nuance imaging system from Cambridge Research & Instrumentation (Woburn, Mass.). Using such a system, one can obtain an image cube, which is a representation of the scene at multiple wavelengths, where a spectrum is available at every point in the image. By unmixing the spectrum into components, one can estimate the presence of various compounds or sources in the scene. Or, one may classify the pixel according to some classification scheme, based on its spectrum and known spectral reference information.

SUMMARY OF THE INVENTION

One aspect of the invention is the recognition that in a birefringent filter using reflective polarizers, light can take a complicated set of paths through the filter, with some making multiple reflections, which leads to unexpected spectral and spatial response.

In one aspect the invention provides for a birefringent filter stage with reflective polarizers at both its entrance and exit, with one or more dichroic polarizer elements between them, which provides performance superior to what is possible with either reflective or dichroic polarizers alone, in terms of cost, transmission, spectral range, spectral quality, image quality, or in some combination thereof.

Another aspect of the invention is the realization that rays which undergo multiple reflections within a birefringent filter are highly polarized, because reflective polarizers achieve their polarizing action primarily by reflecting, rather than absorbing, energy in the unwanted polarization state. In one embodiment, the invention provides filters with high spectral and spatial purity, in which multiple reflections at the polarizer elements do not degrade the overall filter performance.

In one embodiment, the invention provides birefringent filters with multiple reflective polarizers having one or more dichroic polarizers placed between them. These act to damp the multiple reflecting beams without unduly penalizing desirable, single-pass transmission. In some embodiments a dichroic polarizer and a reflective polarizer are placed adjacent one another with their transmission axes aligned; in other embodiments, a dichroic polarizer and a reflective polarizer are separated by a birefringent element or by a birefringent network.

One aspect of the invention is that recognition that the extinction performance of a filter stage can be superior to that of the dichroic polarizer. Specifically, the filter requires only moderate dichroism in the damping element in order to attain a high level of spectral performance overall, because the reflected light traverses the dichroic element several times, enhancing its effect.

In some embodiments, the invention provides birefringent filters which use no costly prism polarizers or dichroic glass. Other embodiments of the invention use dichroic glass only to a limited degree so the overall design is economical to produce. Still other embodiments use dichroic glass but obtain enhanced spectral range compared to comparable designs in the prior art.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
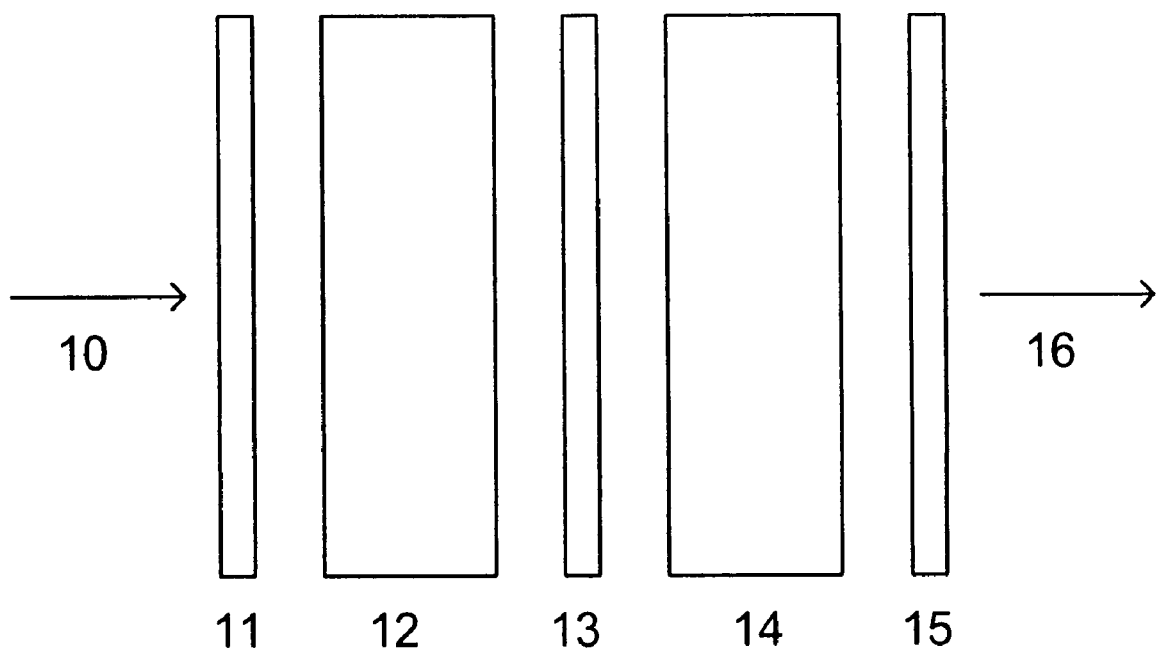
FIG. 1 is a block diagram depiction of a generic birefringent filter in which the present invention is implemented.

The invention relates to birefringent filters which use reflective polarizers. Birefringent filters consist of one or more filter stages in optical series, where each stage has a retarder network and exit polarizer; there is an overall input polarizer in front if the filter is to operate on unpolarized incident light. An exemplary birefringent filter is shown in FIG. 1 in which incident light 10 enters through an input polarizer 11, then encounters a first filter stage 12 with an output polarizer 13. An optional second stage 14 with an output polarizer 15 receives light from the first filter stage 12. The strength of transmitted light beam 16 depends upon $\lambda$, the wavelength of incident light 10. The invention can be applied to filters using stages of various types, including Lyot stages, Solc stages and arbitary birefringent networks. Also, it may be used on filters where successive polarizers have their axes parallel to one another, or crossed at an angle.

The following notation is used in describing the invention. First, for each stage, one may speak of the proportion of incident light $\alpha(\lambda)$ which the birefringent network transforms from the polarization state it receives from the previous polarizer, into the transmissive state of its own exit polarizer. This formalism treats stages with crossed polars identically to those with parallel polars, and makes it easy to treat birefringent networks with complicated spectral response functions $\alpha(\lambda)$. Note that light in the polarization state which the previous polar would reject, is transformed into the polarization state which its exit polar would reject—or vice versa—in exactly the same degree, namely $\alpha(\lambda)$. If one makes the approximation that the birefringent network is optically lossless, the fraction of light which is delivered from one polarizer's rejection state to the other's pass state (or vice versa) is simply the complement of this, denoted as $\alpha_c(\lambda)$.

In this analysis, the reflective polarizer is ideal, meaning it reflects all incident light polarized along a first axis, and transmits all light polarized along an orthogonal axis. More advanced models, which include the effects of partial absorption and transmission of each polarization component at the polarizers, can be made based on the approach shown here, but the key phenomena related to multiple reflection are evident even from this simple analysis.

Figure 2:
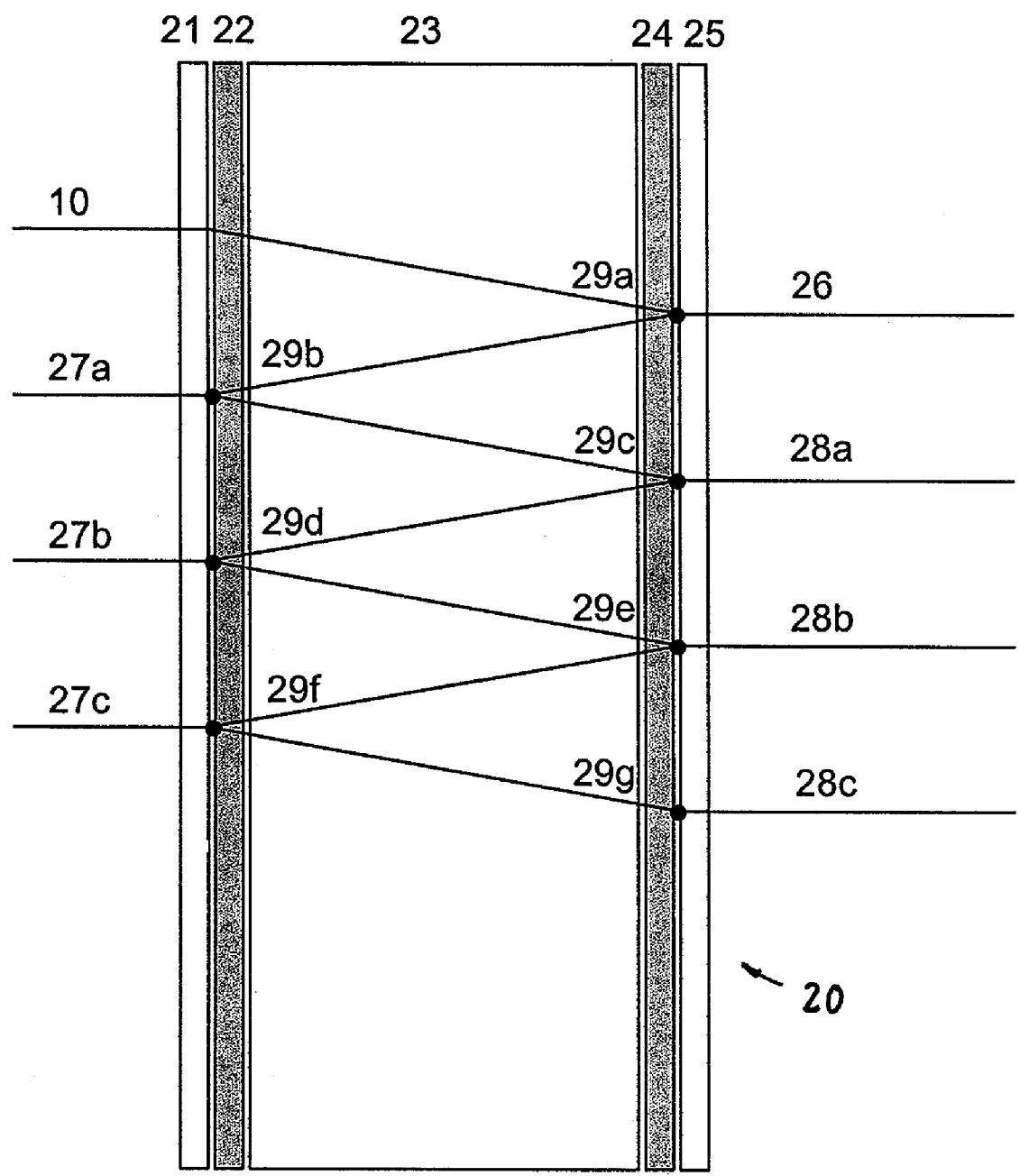
FIG. 2 is a schematic view of a birefringent filter stage incorporating reflective polarizer elements.

FIG. 2 shows a birefringent filter stage 20 according to an embodiment of the invention incorporating reflective polarizer elements. The primary transmission path in the view of FIG. 2 is left-to-right for incident light. In this drawing and others in this description which illustrate rays undergoing multiple reflection, normally incident rays are drawn at an angle for some portion of their travel. This is done for visual clarity so the rays do not overlap on the drawing. In a real system, the rays travel along paths that depend on the incident light angle, the refractive indices, and the reflector orientations, as is known in the optical art. Incident light 10 traveling rightward encounters a reflective input polarizer 21, then a dichroic polarizer 22, and then a birefringent network 23 which transforms its polarization state in a wavelength-dependent manner. An exit polarizer is made up of an optional dichroic polarizer 24 followed by a reflective polarizer 25. Light which is transmitted without reflection is depicted as beam 26. Light which is reflected once at a reflective polarizer is depicted leaving the filter as beam 27a, while light that reflects 3 or 5 times is shown leaving the filter as 27b and 27c, respectively. Light which is reflected two times at a reflective polarizer is depicted leaving the filter as beam 28a, while light that reflects 4 or 6 times depicted as 28b and 28c, respectively. Higher order odd- and even-order reflections that contribute to beams 27 and 28 are omitted for clarity. Light reflecting within the arrangement passes through points 29a-29g as it progresses.

The dichroic polarizer elements 22 and 24 are described in terms of transmission for light energy polarized along its transmission axis, and along its extinction axis; denoted as $T_i(\lambda)$ and $X_i(\lambda)$, respectively, where the subscript i denotes the polarizer identity. Because this analysis considers intensities and energies, rather than electric field strengths, it is not sensitive to interference effects that may be introduced by multiple-reflection rays. This is a reasonable approximation for many situations, where incoherent light is being filtered, where phase interference may be neglected.

Now one may consider the behavior of a birefringent filter stage having reflective polarizers at both the entrance and exit faces, as diagrammed in FIG. 2. It is the goal of this analysis to determine the intensity of rays as they traverse the stage through multiple reflections, and to write an expression for the signal strength of beams 26, 27, and 28. It is helpful to also determine the strength of beams at points 29a, 29b,

One may write the strength of beam 26 in terms of the incident beam intensity $I_0$ and the above factors, by inspection:

$$I_{26} = I_0 * \alpha(\lambda) * T_{22}(\lambda) \qquad [1a]$$

Normalizing by the incident energy, one can write the transmission in this component as $$T_{26} = \alpha(\lambda) * T_{22}(\lambda) \qquad [1b]$$

The beam propagating from 29a-29b is the beam rejected at polarizer 25, which passes through 24 twice (before and after reflection), so has intensity proportional to $\alpha_c$, the energy delivered from the transmission axis of one polarizer to the absorption axis of the other:

$$I_{29a-b} = I_0 * \alpha_c(\lambda) * T_{22}(\lambda) * X_{24}(\lambda)^2 \qquad [2a]$$

From this, one may calculate the energy in beam $27_a$ as $$I_{27a} = I_0 * \alpha_c(\lambda)^2 * T_{22}(\lambda)^2 * X_{24}(\lambda)^2 \qquad [2b]$$

since it is the energy in equation [2a], after allowing for polarization selection and transmission through the dichroic polarizer 22 along its transmission axis. In the same way, following the beam through its reflections, one can obtain the energy at each step along the way:

$$I_{29b-c} = I_0 * \alpha_c(\lambda) * \alpha(\lambda) * T_{22}(\lambda) * X_{22}(\lambda)^2 * X_{24}(\lambda)^2 \qquad [2c]$$

$$I_{28a} = I_0 * \alpha_c(\lambda)^2 * \alpha(\lambda) * T_{22}(\lambda) * T_{24}(\lambda) * X_{22}(\lambda)^2 * X_{24}(\lambda)^2 \qquad [2d]$$

$$I_{29c-d} = I_0 * \alpha_c(\lambda) * \alpha(\lambda)^2 * T_{22}(\lambda) * X_{22}(\lambda)^2 * X_{24}(\lambda)^4 \qquad [2e]$$

$$I_{27b} = I_0 * \alpha_c(\lambda)^2 * \alpha(\lambda)^2 * T_{22}(\lambda)^2 * X_{22}(\lambda)^2 * X_{24}(\lambda)^4 \qquad [2f]$$

$$I_{29d-e} = I_0 * \alpha_c(\lambda) * \alpha(\lambda)^3 * T_{22}(\lambda) * X_{22}(\lambda)^4 * X_{24}(\lambda)^4 \qquad [2g]$$

$$I_{28b} = I_0 * \alpha_c(\lambda)^2 * \alpha(\lambda)^3 * T_{22}(\lambda) * T_{24}(\lambda) * X_{22}(\lambda)^4 * X_{24}(\lambda)^4 \qquad [2h]$$

$$I_{29e-f} = I_0 * \alpha_c(\lambda) * \alpha(\lambda)^4 * T_{22}(\lambda) * X_{22}(\lambda)^4 * X_{24}(\lambda)^6 \qquad [2i]$$

$$I_{27c} = I_0 * \alpha_c(\lambda)^2 * \alpha(\lambda)^4 * T_{22}(\lambda)^2 * X_{22}(\lambda)^4 * X_{24}(\lambda)^6 \qquad [2j]$$

$$I_{29f-g} = I_0 * \alpha_c(\lambda) * \alpha(\lambda)^5 * T_{22}(\lambda) * X_{22}(\lambda)^6 * X_{24}(\lambda)^6 \qquad [2k]$$

$$I_{28c} = I_0 * \alpha_c(\lambda)^2 * \alpha(\lambda)^4 * T_{22}(\lambda) * T_{24}(\lambda) * X_{22}(\lambda)^4 * X_{24}(\lambda)^6 \qquad [2l]$$

One can see that successive terms occur in proportion which is termed γ:

$$\gamma = I_{27b}/I_{27a} = I_{27c}/I_{27b} = I_{28b}/I_{28a} = I_{28c}/I_{28b} = \alpha(\lambda)^2 * X_{22}(\lambda)^2 * X_{24}(\lambda)^2 \qquad [3]$$

so the terms $I_{27a}, I_{27b}, I_{27c} \ldots$ form an infinite series of the form $K(1+a+a^2+a^3 \ldots)$, and for such a series, the terms sum to the value $K/(1-a)$. Thus we write for the sum of all reflections exiting the stage propagating leftward:

$$I_{27} = I_0 * \alpha_c(\lambda)^2 * T_{22}(\lambda)^2 * X_{24}(\lambda)^2 / [1-\gamma] \qquad [4a]$$

Dividing by the incident intensity, we can write the reflection coefficient as $$R_{27} = \alpha_c(\lambda)^2 * T_{22}(\lambda)^2 * X_{24}(\lambda)^2 / [1-\gamma] \qquad [4b]$$

Similarly, for the multiply reflected forward-propagating beams, $$I_{28} = I_0 * \alpha_c(\lambda)^2 * \alpha(\lambda) * T_{22}(\lambda) * T_{24}(\lambda) * X_{22}(\lambda)^2 * X_{24}(\lambda)^2 / [1-\gamma] \qquad [5a]$$

$$T_{28} = \alpha_c(\lambda)^2 * \alpha(\lambda) * T_{22}(\lambda) * T_{24}(\lambda) * X_{22}(\lambda)^2 * X_{24}(\lambda)^2 / [1-\gamma] \qquad [5b]$$

Comparing $T_{28}$ against $T_{26}$ using equations 1b and 5b, we obtain the relative strength of the multiply-reflected beams to the ballistic beam which underwent no reflections:

$$T_{28}/T_{26} = \alpha_c(\lambda)^2 * T_{24}(\lambda) * X_{22}(\lambda)^2 * X_{24}(\lambda)^2 / [1-\gamma] / \alpha(\lambda) \qquad [6]$$

In this way, we have obtained the transmission coefficient for ballistic and multiply-reflected beams, and the reflection coefficient for light incident from the left-hand side. They are indicated using the notation $$T_{ball} = T_{26} \qquad [7a]$$

$$T_{mp} = T_{28} \qquad [7b]$$

$$R_{lh} = R_{27} \qquad [7c]$$

The signal from multiply-reflected beams is also termed "multipath" signal, and it can be problematic in an imaging system, since multipath beams may not come to focus at the same place as ballistic beams. This can degrade the spatial fidelity of the image which is produced, appearing as blur, or halo, or reduced image contrast. When a multispectral image cube contains these artifacts, the quantitative accuracy is affected as well, so spectral unmixing or spectral classification can be degraded.

Using the result of equation [7c], one can obtain the reflection coefficient for light incident from the right-hand side. The physical mechanisms for such light are identical to those just considered, but formally the subscripts must be changed, so that the reflection coefficient for light incident from the right hand side is written as $$R_{rh} = \alpha_c(\lambda)^2 * T_{24}(\lambda)^2 * X_{22}(\lambda)^2 / [1-\gamma] \qquad [7d]$$

Note that γ contains equal terms in $X_{22}(\lambda)$ and $X_{24}(\lambda)$, as do $T_{mp}$ and $T_{ball}$. This is consistent with the optics precept that the transmission coefficient for a ray passing through an optical system is independent of which direction the ray is traveled—though the same is not true for its reflection coefficient, as $R_{rh}$ and $R_{lh}$ illustrate.

Figure 3:
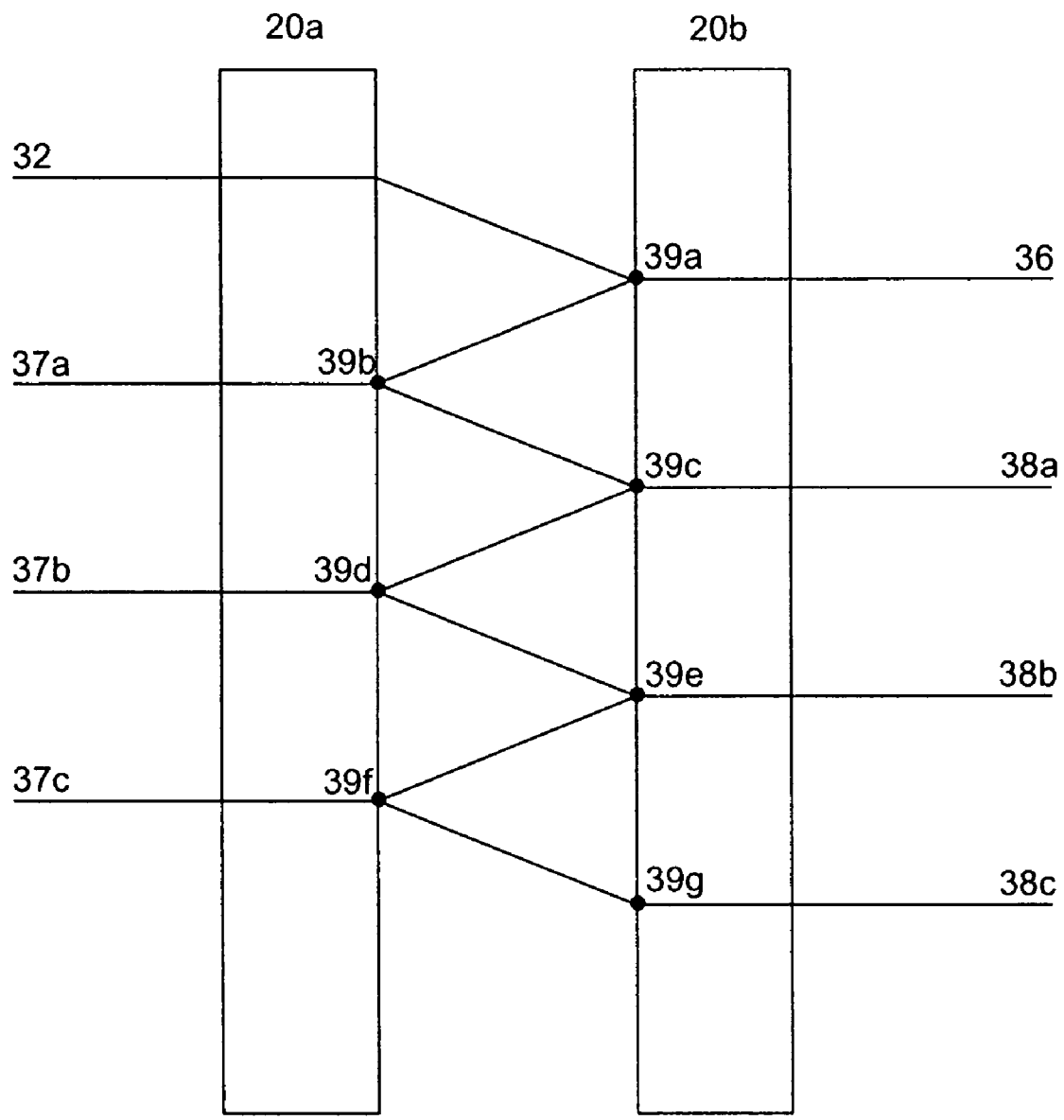
FIG. 3 is a schematic view of an embodiment of the present invention including an assembly of two birefringent stages placed in optical series.

When two stages are placed in optical series, they interact through reflections between stages, so the overall transmission of the ensemble depends not just on the transmission of each stage, but also on its reflection. This is illustrated in FIG. 3, which depicts an assembly with light passing through a first birefringent stage 20a on its way toward a second birefringent stage 20b. According to FIG. 3, incident light 32 traveling rightward is partially transmitted and partly reflected by each of the first and second birefringent stages 20a, 20b. Beam 36 is transmitted without reflection by either stage. Beam 37 consists of rays 37a that were reflected by one stage; rays 37b that were reflected from stage to stage 3 times; rays 37c that were reflected from stage to stage 5 times; and higher-order reflections that are omitted for clarity. Beam 38 consists of rays 38a, 38b, and 38c that were reflected from stage to stage 2, 4, and 6 times respectively; along with higher-order reflections that are omitted for clarity. Light reflecting between the stages passes through points 39a-39g as it progresses.

That is, light which passes through both stages without reflection between stages is depicted as 36, while light which experiences 1, 3, or 5 reflections from one stage to another is depicted as components 37a, 37b, or 37c, and propagates backwards as a reflected beam, and light which experiences 2, 4, or 6 reflections from one stage to another is depicted as components 38a, 38b, or 38c, and propagates forward as a transmitted beam.

Beam 36 has a strength given by:

$$I_{36}=I_0*(T_{20a\,ball}*T_{20b\,ball})+I_0*(T_{20a\,mp}*T_{20b}+T_{20a}*T_{20b\,mp}) \quad [8a]$$

Here the first term represents the ballistic portion (which underwent no reflections within either stage) and the second portion represents multipath signal, even though it did not reflect between one stage and another. In this equation, and throughout this analysis, subscripts mp and ball are used to denote the multipath and ballistic portion of the signal; when neither of these is present, the entire signal (multipath+ballistic) is described.

The signal strength in the other beams may be calculated by chasing the light through the sequence of reflections, as follows:

$$I_{37a}=I_0*(T_{20a})^2*R_{20b\,L} \quad [8b]$$

$$I_{38a}=I_0*T_{20a}*T_{20b}*R_{20b\,L}*R_{20a\,R} \quad [8c]$$

$$I_{37b}=I_0*(T_{20a})^2*R_{20b\,L}*(R_{20a\,L}*R_{20a\,R}) \quad [8d]$$

$$I_{38b}=I_0*T_{20a}*T_{20b}*(R_{20b\,L}*R_{20a\,R})^2 \quad [8e]$$

$$I_{37c}=I_0*(T_{20a})^2*R_{20b\,L}*(R_{20a\,R}*R_{20b\,L})^2 \quad [8f]$$

$$I_{38c}=I_0*T_{20a}*T_{20b}*(R_{20b\,L}*R_{20a\,R})^3 \quad [8g]$$

Recognizing that the series of terms for $I_{37}$ and $I_{38}$ can be written in closed form as was done earlier, and grouping the multipath component of $I_{36}$ with $I_{38}$, one may write the transmission and reflection coefficients for the assembly of two stages as $$T_{ball}=T_{20a\,ball}*T_{20b\,ball} \quad [9a]$$

$$T_{mp}=T_{20a\,mp}*T_{20b}+T_{20a}*T_{20b\,mp}+T_{20a}*T_{20b}*R_{20b\,L}*R_{20a\,R}/(1-R_{20b\,L}*R_{20a\,R}) \quad [9b]$$

$$R_L=(T_{20a})^2*R_{20b\,L}/(1-R_{20b\,L}*R_{20a\,R}) \quad [9c]$$

As above, one may write the reflection for light incident from the right-hand side by changing subscripts to correspond to that situation, with the result:

$$R_R=(T_{20b})^2*R_{20a\,R}/(1-R_{20a\,R}*R_{20b\,L}) \quad [9d]$$

Using equations [9a]-[9d], one can describe the properties of a pair of stages, given the properties of each stage. The properties involved are the ballistic and multipath transmission coefficients, and the reflection coefficients for light incident from either direction.

These equations are generic, and can be used to describe the behavior of a system made up of any two components or assemblies, provided that the various parameters are known for each one. The same limitations of the model apply here as above, namely that effects related to phase interference are not considered, so it is most nearly correct when the coherence length of light is shorter than the round-trip path through one reflection.

Recognizing this, the behavior of a multistage birefringent filter is calculated as follows. Equations [7a]-[7d] are used to calculate the reflection and transmission properties of two stages in isolation, namely the last two stages of a birefringent filter. Then, equations [9a]-[9d] are used to calculate the properties of those two stages, viewed as an assembly. Then, the properties of the previous stage are calculated using equations [7a]-[7d], and equations [9a]-[9d] are used to calculate the properties of an assembly made up of that the previous stage, together with the assembly just analyzed. In this way, one may work backwards to form larger and larger assemblies, to analyze systems containing an arbitrary number of stages.

This can be conveniently done numerically, using computer software such as Matlab, offered by The MathWorks (Natick, Mass.).

Figure 4:
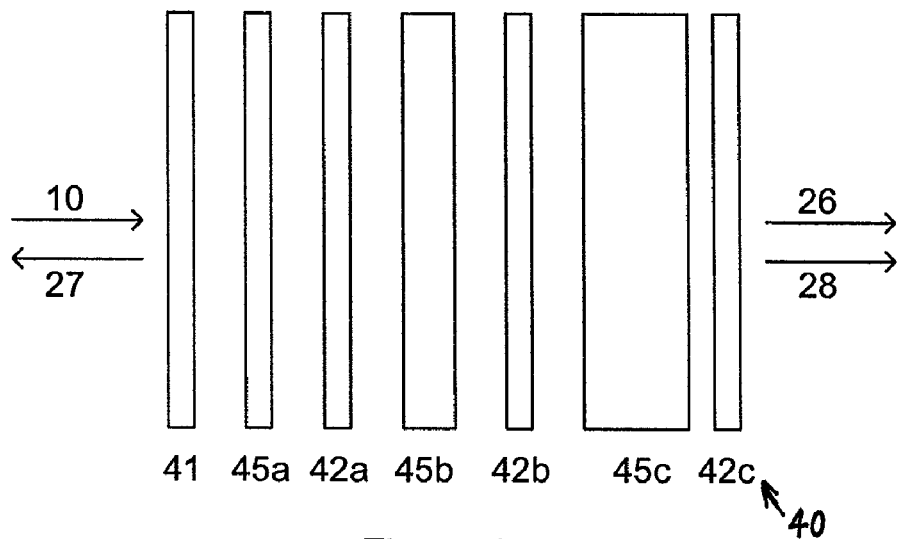
FIG. 4 shows a 3-stage Lyot filter for implementing the present invention.

FIG. 4 shows a 3-stage Lyot filter 40 constructed with quartz retarders 45a, 45b, and 45c having thicknesses of 0.125 mm, 0.250 mm, and 0.500 mm, respectively. Incident light 10 encounters entrance polarizer 41, then encounters the retarders 45a-c and polarizers 42a-c in alternating sequence. Beam 26 is transmitted without reflection, while beam 27 is reflected and beam 28 is transmitted after two or more reflections within the filter assembly.

The system of FIG. 4 was modeled for various types of polarizer materials. The filter 40 was first modeled for the case when each of the polarizers 41 and 42a-c is a dichroic sheet film was used, based on measured transmission and extinction coefficients for Sanritz LLC25618 film. That is, each polarizer 41 and 42a-c is modeled as a sheet of Sanritz 5618 dichroic polarizer. Since this is a dichroic material with no significant reflection, the system was modeled using only the forward-propagating beams, including effects of leakage at the polarizers. According to this first model, the entrance polarizer 41 is arranged to transmit horizontally polarized visible light, and the other polarizers 42a-c are arranged to transmit vertically polarized visible light.

Figure 5A:
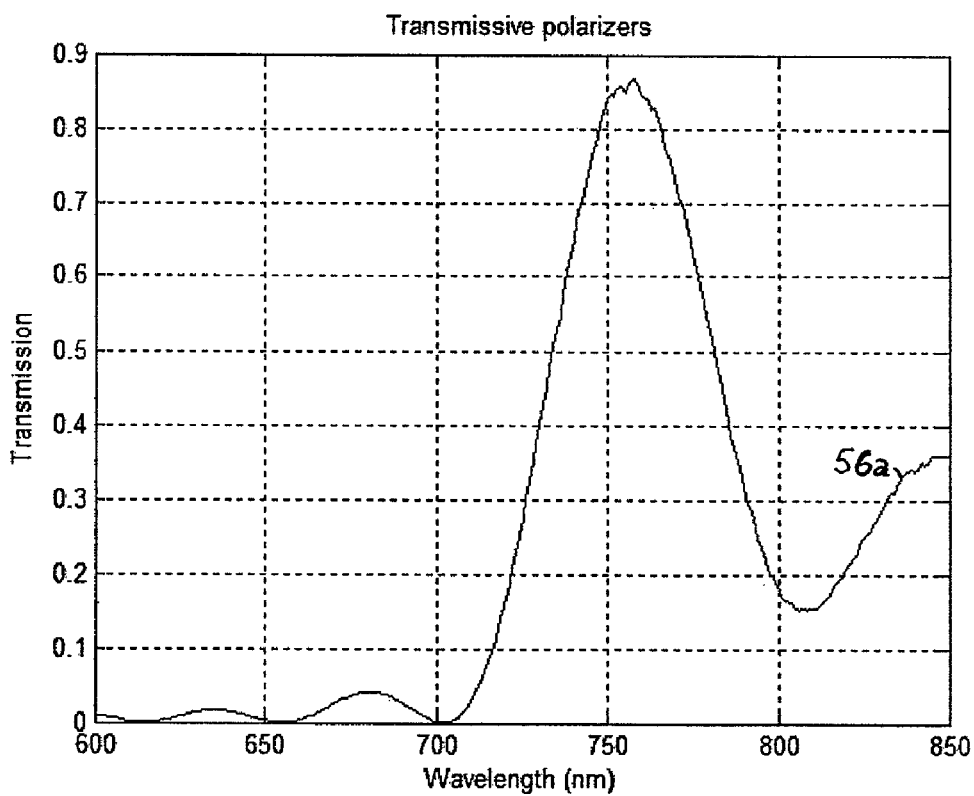
FIG. 5a is a graph showing characteristics of a modeled spectral response of the filter of FIG. 4 when each polarizer is a sheet of Sanritz 5618 dichroic polarizer.

The results of the above-described first modeled case of FIG. 4 system are shown in FIG. 5a. The total transmission is shown as 56a, of which essentially none is multipath transmission. The primary transmission peak is at 756 nm, and there are side-lobes at shorter wavelengths due to imperfect blocking of adjacent orders, as is known in the art of birefringent filter design. Turning to wavelengths longer than the transmission peak, there is significant leakage due to the imperfect extinction of the visible-range polarizer material, when viewed at infrared wavelengths.

The system of FIG. 4 was modeled for the second case when the polarizers 41 and 42a-c are reflective polarizers, using equations [7a]-[7d] to calculate the response of individual stages, and equations [9a]-[9d] to assemble the response of the overall filter from the stage responses. The modeled polarizer properties were based as Moxtek PPL05 reflective polarizer material. The actual measured transmission was used, but the reflection was taken as idealized as described above, namely, that the light reflected and transmitted by this material were perfectly polarized, and that the reflection efficiency was 100 percent. The results of this analysis are shown in FIG. 5b, which depicts the total transmitted signal as 56b and the multipath transmitted component as 58b.

Figure 5B:
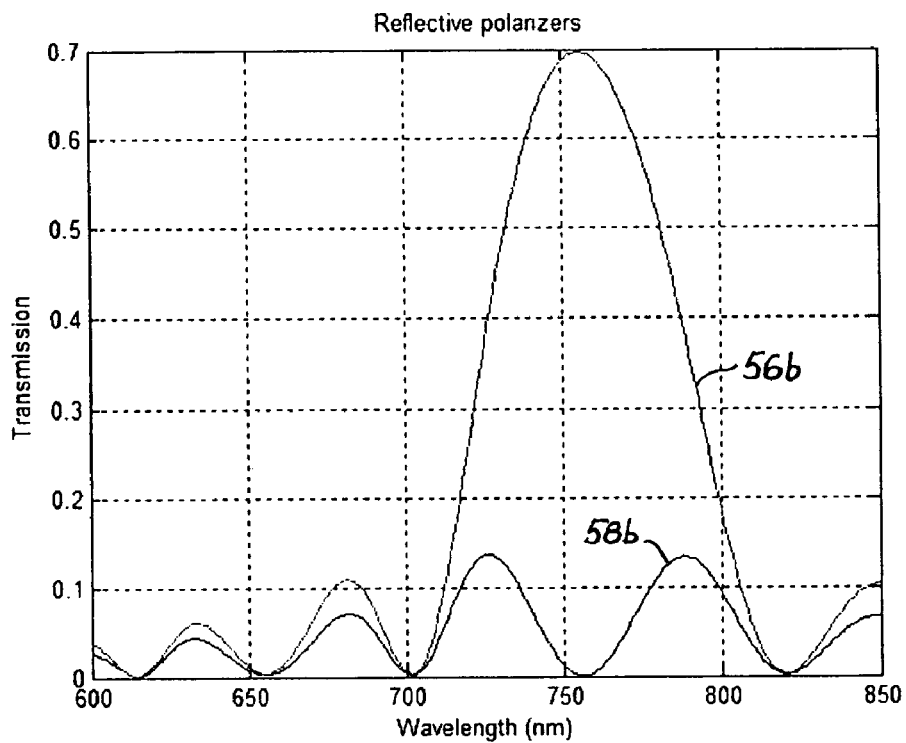
FIG. 5b is a graph showing characteristics of a modeled spectral response of the filter of FIG. 4 when each polarizer is a piece of Moxtek reflective polarizer.

As FIG. 5b illustrates, there is significant multi-path signal: overall, the multi-path signal is 23% of the total, or approximately ⅓ as large is the desired (ballistic) transmitted signal. The multipath energy, having taken a longer path with multiple reflections, may not be imaged by an imaging system to the same location as energy which traversed the filter in a single pass. Also, one may notice that the multipath signal 58b forms a greater proportion of the out-of-band light. For example, in the region λ<700 nm, the multipath energy is 2.04× greater than the desired ballistic signal. This means that the out-of-band energy is considerably increased by the presence of multipath beams.

Figure 4A:
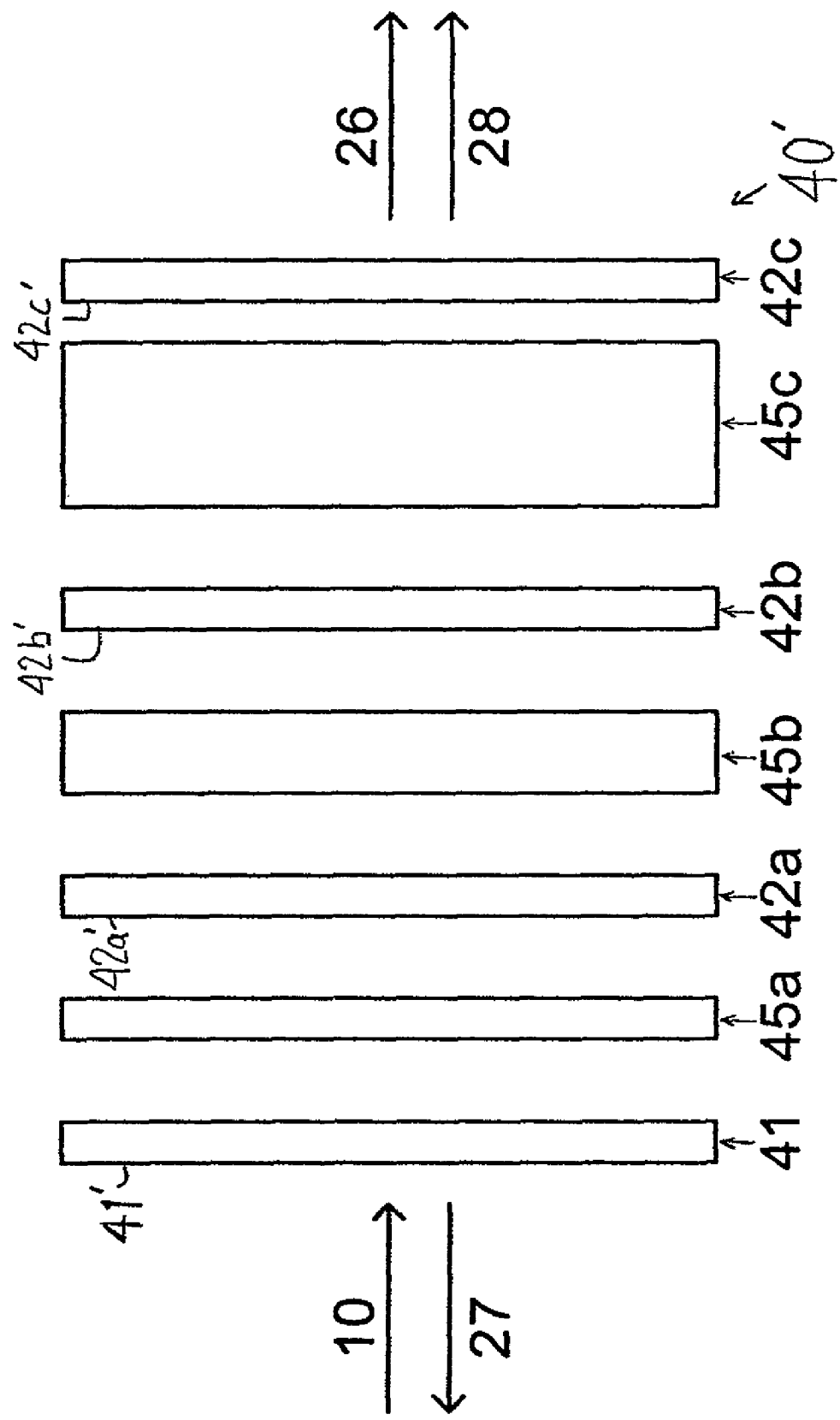
FIG. 4a shows a 3-stage Lyot filter of FIG. 4 according to another embodiment.
Figure 5C:
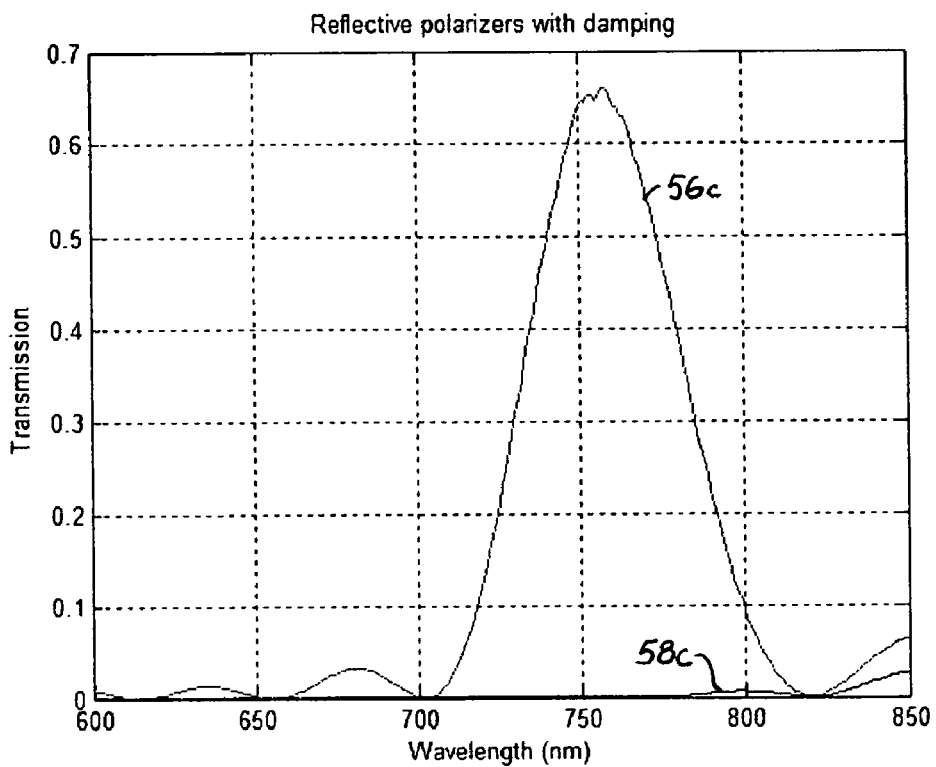
FIG. 5c is a graph showing characteristics of a modeled spectral response of the filter of FIG. 4 when each polarizer consists of a Moxtek reflective polarizer and a sheet of Sanritz 5618 dichroic polarizer, having their transmission axes aligned.

FIG. 4a illustrates a filter 40' based on the system of FIG. 4 modeled using a third model for the case when each polarizer 41 and 42a-c includes a Moxtek reflective polarizer and one sheet of dichroic visible film polarizer material 41', 42a', 42b', 42c' is placed adjacent to the reflective polarizer, facing toward the incident light. The total signal and multipath signal are shown in FIG. 5c as curves 56c and 58c, respectively.

In this third model, there is essentially no leakage, and the multipath signal has been enormously reduced, compared with the case just considered with no damping. Specifically, the total multipath energy is only 1.4 percent of the total signal, rather than 23 percent. And, the out-of-band spectral leakage due to multipath is virtually zero in the stopband below 700 nm. Even in the stopband above 820 nm, where visible dichroic sheet film has little extinction, multipath is only 0.64× as large as the ballistic component. So rather than tripling the out-of-band leakage—as was the case for the system using only reflective polarizers—the multipath energy increases it by 64 percent.

The resulting filter of the third model offers a considerably reduction in multipath energy compared to a reflective-polarizer system of the second model; in a multispectral imaging system this typically improves the image contrast, visual sharpness, detection limit, and quantitative accuracy. So while it is possible to construct a tunable filter using only reflective polarizer materials, use of dichroic sheet adjacent to reflective polarizers essentially eliminates the problem of multipath signals, and reduces unwanted leakage for wavelengths in the stopband, i.e. outside the desired range.

At the same time, out-of-band leakage is markedly reduced by the combination of reflective polarizer and dichroic sheet. The assembly performs well even at wavelengths where the dichroic sheet polarizer has high leakage—meaning, a high degree of transmission for light polarized along its extinction axis. For example, at 800 nm, even though the dichroic sheet has leakage of 30 percent, the overall assembly has multipath of under 1 percent. This means its transmission very nearly matches that of a filter built with perfect transmissive polarizer. And, at 850 nm, even though the dichroic sheet polarizer is very weakly polarizing—with leakage of 75 percent—the overall assembly has a multipath signal of only 2.6 percent. This is 13× lower than the first model filter shown in FIG. 5a, which used only dichroic sheet polarizer.

So, for a given transmissive polarizer material, placing a dichroic polarizer adjacent to a reflective polarizer enables construction of a filter that operates well over a wider wavelength range than with the dichroic material alone.

Although the third modeled version of the FIG. 4 filter includes one dichroic sheet on a side of the reflective polarizer facing the incident light, the dichroic sheet may alternatively be arranged on a side of the reflective polarizer facing away from the incident light. Still another embodiment may include a Moxtek reflective polarizer sandwiched between two sheets of Sanritz 5618 dichroic polarizer, having their transmission axes combined.

Figure 6:
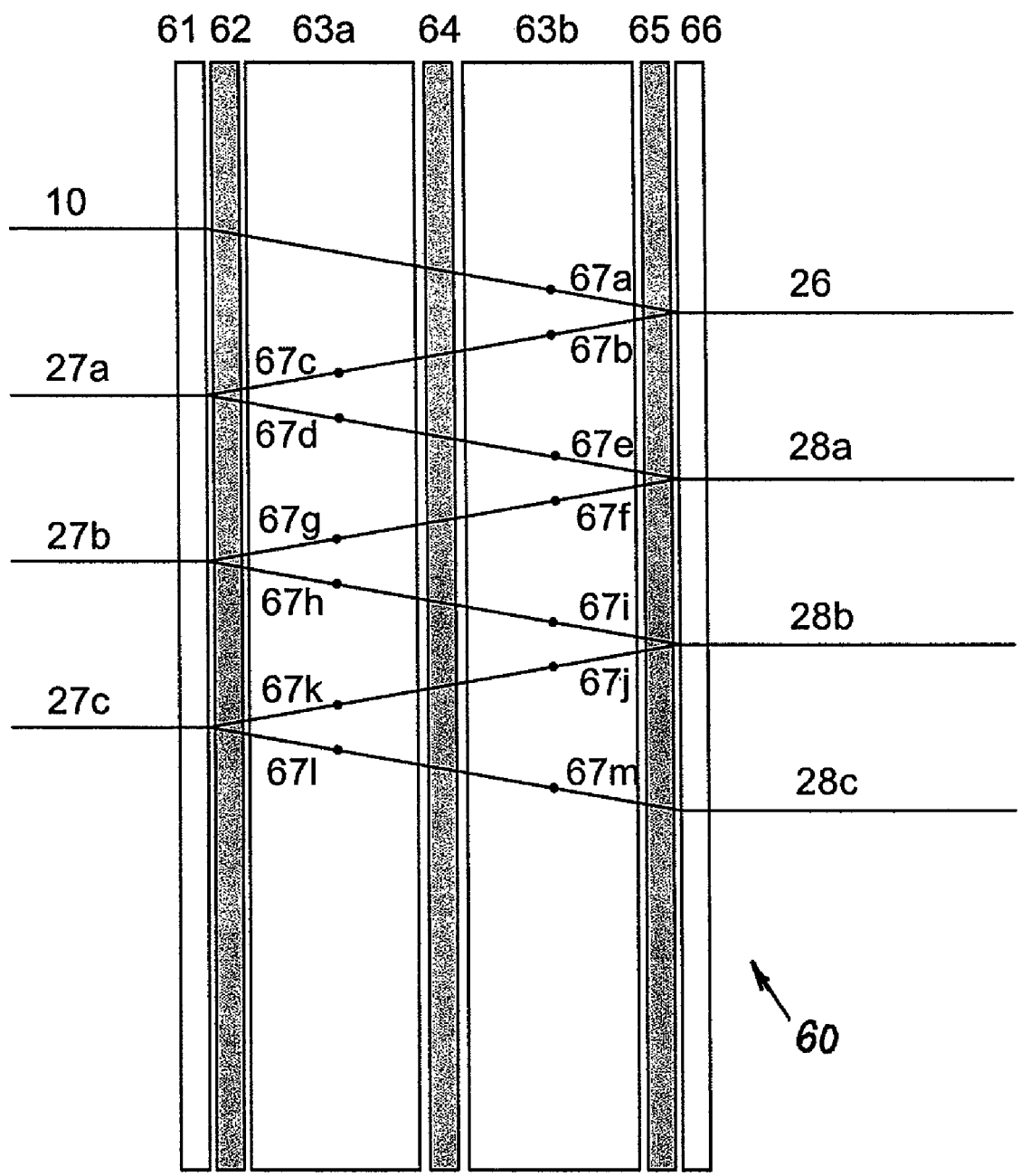
FIG. 6 is a schematic view of an embodiment of a filter assembly having two birefringent networks.

Another aspect of the present invention involves combining reflective polarizers with dichroic polarizers, separated by a birefringent retarder, or retarder network. For example, FIG. 6 is a schematic view of an assembly 60 which contains two birefringent networks 63a and 63b interposed between entrance polarizers 61 and 62, middle dichroic polarizer 64 and exit polarizers 65 and 66, with the dichroic transmission axis aligned to the adjacent reflective polarizer's transmission axis. Polarizers 61 and 66 are reflective type while optional polarizers 62 and 65 are dichroic type. Incident light 10 which is transmitted without reflection is depicted as beam 26. Light which is reflected once at a reflective polarizer is depicted as beam 27a, while light that reflects 3 or 5 times is depicted as 27b and 27c, respectively. Light reflected two times at a reflective polarizer is depicted as beam 28a, while light that reflects 4 or 6 times is depicted as 28b and 28c, respectively. Higher order odd- and even-order reflections that contribute to beams 27 and 28 are omitted for clarity. Light reflecting between the stages passes through points 67a-k as it progresses.

Using similar methodology to that above, one may calculate the energy in a beam as it propagates through this system and undergoes reflection and absorption at the various polarizers. This analysis includes the effects of leakage at the dichroic polarizer 64, so signals at points such as 67a, 67c, and 67e will include contributions from both polarization states. Throughout this section, the term $\alpha_1$ is used to denote a for element 63a and the adjacent polarizers, and $\alpha_2$ is used to denote α for element 63b and the adjacent polarizers. Also, the $\alpha_c$ denotes the complement $(1-\alpha)$ so $\alpha_{1c}$ denotes the complement of $\alpha_1$.

$$I_{67a}=I_0*T_{61}T_{62}*[\alpha_1 T_{64}+\alpha_{1c}X_{64}] \quad [10a]$$

$$I_{26}=I_0*T_{61}T_{62}T_{65}T_{66}*[\alpha_1\alpha_2 T_{64}+\alpha_{1c}\alpha_{2c}X_{64}] \quad [10b]$$

$$I_{67b}=I_0*T_{61}T_{62}(X_{65})^2*[\alpha_1\alpha_2 T_{64}+\alpha_{1c}\alpha_2 X_{64}] \quad [10c]$$

$$I_{67c}=I_0*T_{61}T_{62}(X_{65})^2*[\alpha_1\alpha_{2c}T_{64}+\alpha_{1c}\alpha_2 X_{64}]*[\alpha_{2c}T_{64}+\alpha_2 X_{64}] \quad [10d]$$

$$I_{27a}=I_0*(T_{61}T_{62}X_{65})^2*[\alpha_1\alpha_{2c}T_{64}+\alpha_{1c}\alpha_2 X_{64}]^2 \quad [10e]$$

$$I_{67d}=I_0*T_{61}T_{62}(X_{62}X_{65})^2*[\alpha_1\alpha_{2c}T_{64}+\alpha_{1c}\alpha_2 X_{64}]*[\alpha_{1c}\alpha_{2c}T_{64}+\alpha_1\alpha_2 X_{64}] \quad [10f]$$

$$I_{67e}=I_0*T_{61}T_{62}(X_{62}X_{65})^2*[\alpha_1\alpha_{2c}T_{64}+\alpha_{1c}\alpha_2 X_{64}]*[\alpha_{1c}\alpha_{2c}T_{64}+\alpha_1\alpha_2 X_{64}]*[\alpha_{1c}T_{64}+\alpha_1 X_{64}] \quad [10g]$$

$$I_{67f}=I_0*T_{61}T_{62}(X_{62}X_{65})^2*[\alpha_1\alpha_{2c}T_{64}+\alpha_{1c}\alpha_2 X_{64}]*[\alpha_{1c}\alpha_{2c}T_{64}+\alpha_1\alpha_2 X_{64}]*[\alpha_{1c}\alpha_{2c}T_{64}+\alpha_1\alpha_2 X_{64}] \quad [10h]$$

$$I_{28a}=I_0*T_{61}T_{62}T_{65}T_{66}(X_{62}X_{65})^2*[\alpha_1\alpha_{2c}T_{64}+\alpha_{1c}\alpha_2 X_{64}]*[\alpha_{1c}\alpha_{2c}T_{64}+\alpha_1\alpha_2 X_{64}]*[\alpha_{1c}\alpha_{2c}T_{64}+\alpha_1\alpha_{2c}X_{64}] \quad [10i]$$

As in the previous cases analyzed, the energy in successive beams such as 27a-c diminishes by the round-trip loss in traversing a set of two reflections, which have relative strengths given by:

$$I_{67f}/I_{67b}=(X_{62}X_{65})^2*[\alpha_{1c}\alpha_{2c}T_{64}+\alpha_1\alpha_2 X_{64}]^2 \quad [10j]$$

And as noted earlier, a series of terms $a+a\gamma+a\gamma^2\ldots$ can be expressed in closed form as $a/(1-\gamma)$. This is exactly the case for the series for $I_{27}$ and $I_{28}$, with $\gamma=I_{67f}/I_{67b}$. So we can write the sum of all terms $I_{27}$ and $I_{28}$ as $$I_{27}=I_0*(T_{61}T_{62}X_{65})^2*[\alpha_1\alpha_{2c}T_{64}+\alpha_{1c}\alpha_2 X_{64}]^2/[1-(X_{62}X_{65})^2*[\alpha_{1c}\alpha_{2c}T_{64}+\alpha_1\alpha_2 X_{64}]^2] \quad [10k]$$

$$I_{28}=I_0*T_{61}T_{62}T_{65}T_{66}(X_{62}X_{65})^{2}*[\alpha_1\alpha_{2c}T_{64}+\alpha_{1c}\alpha_2X_{64}]$$
$$*[\alpha_{1c}\alpha_{2c}T_{64}+\alpha_1\alpha_2X_{64}]*[\alpha_{1c}\alpha_2T_{64}+\alpha_1\alpha_{2c}X_{64}]/$$
$$[1-(X_{62}X_{65})^{2}*[\alpha_{1c}\alpha_{2c}T_{64}+\alpha_1\alpha_2X_{64}]^{2}] \quad [10l]$$

Dividing by $I_0$, one may obtain the overall transmission and reflection coefficients as $$T_{ball}=T_{61}T_{62}T_{65}T_{66}*[\alpha_1\alpha_2T_{64}+\alpha_{1c}\alpha_{2c}X_{64}] \quad [11a]$$

$$T_{mp}=T_{61}T_{62}T_{65}T_{66}(X_{62}X_{65})^{2}*[\alpha_1\alpha_{2c}T_{64}+\alpha_{1c}\alpha_2X_{64}]*$$
$$[\alpha_{1c}\alpha_{2c}T_{64}+\alpha_1\alpha_2X_{64}]*[\alpha_{1c}\alpha_2T_{64}+\alpha_1\alpha_{2c}X_{64}]/$$
$$[1-(X_{62}X_{65})^{2}*[\alpha_{1c}\alpha_{2c}T_{64}+\alpha_1\alpha_2X_{64}]^{2}] \quad [11b]$$

$$R_L=(T_{61}T_{62}X_{65})^{2}*[\alpha_1\alpha_{2c}T_{64}+\alpha_{1c}\alpha_2X_{64}]^{2}/[1-(X_{62}X_{65})^{2}*[\alpha_{1c}\alpha_{2c}T_{64}+\alpha_1\alpha_2X_{64}]^{2}] \quad [11c]$$

As before, we may derive the reflection for beams incident from the right-hand side by formal substitution of parameters:

$$R_R=(T_{65}T_{66}X_{62})^{2}*[\alpha_2\alpha_{1c}T_{64}+\alpha_{2c}\alpha_1X_{64}]^{2}/[1-(X_{62}X_{65})^{2}*[\alpha_{1c}\alpha_{2c}T_{64}+\alpha_1\alpha_2X_{64}]^{2}] \quad [11d]$$

Such a stage provides a filter action corresponding to two individual birefringent stages, but only requires use of a single dichroic polarizer element 64. When dichroic sheet polarizer is used, this provides an alternative design to the embodiment described earlier, in which dichroic sheet was placed adjacent to the reflective polarizer. This design is valuable because one may construct a filter having N stages which uses only N/2 pieces of dichroic polarizer, rather than the usual N. This can be valuable when the dichroic film is expensive; or has low optical transmission.

This design also has low multipath energy, so is generally consistent with high imaging quality and spectral quality. It is possible to further improve it using dichroic sheet film in locations 62 and 65, which act as damping elements to reduce multipath energy. These need not be the same material as the central polarizer 64, and will reduce the multipath signal to some degree even if they may exhibit less extinction than the central polarizer.

For example, the central polarizer may be a piece of colorpol dichroic glass from Codixx, in optical series with a piece of dichroic visible sheet polarizer; while the damping polarizers 62 and 65 may be Sanritz LLC2-9518. The damping polarizers improve multipath levels and the overall filter can be operated over the spectral range from 450 nm-900 nm.

Figure 7A:
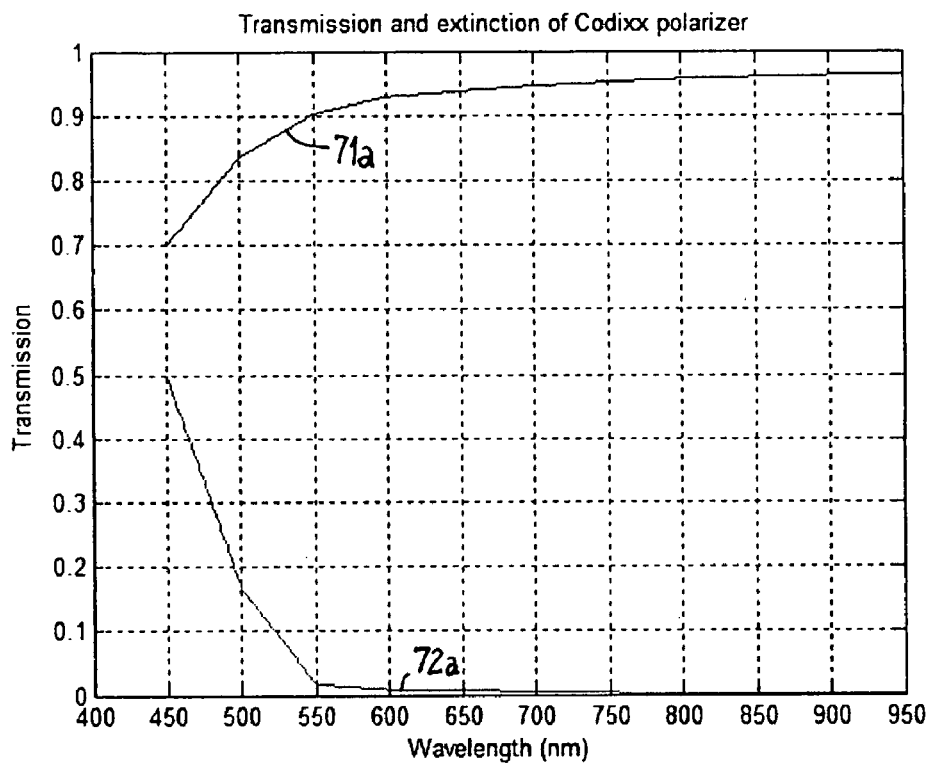
FIG. 7a shows the transmission of dichroic glass polarizer material from Codixx AG, model number colorPol 650-1100 AC, along the transmission and absorption axes.
Figure 7B:
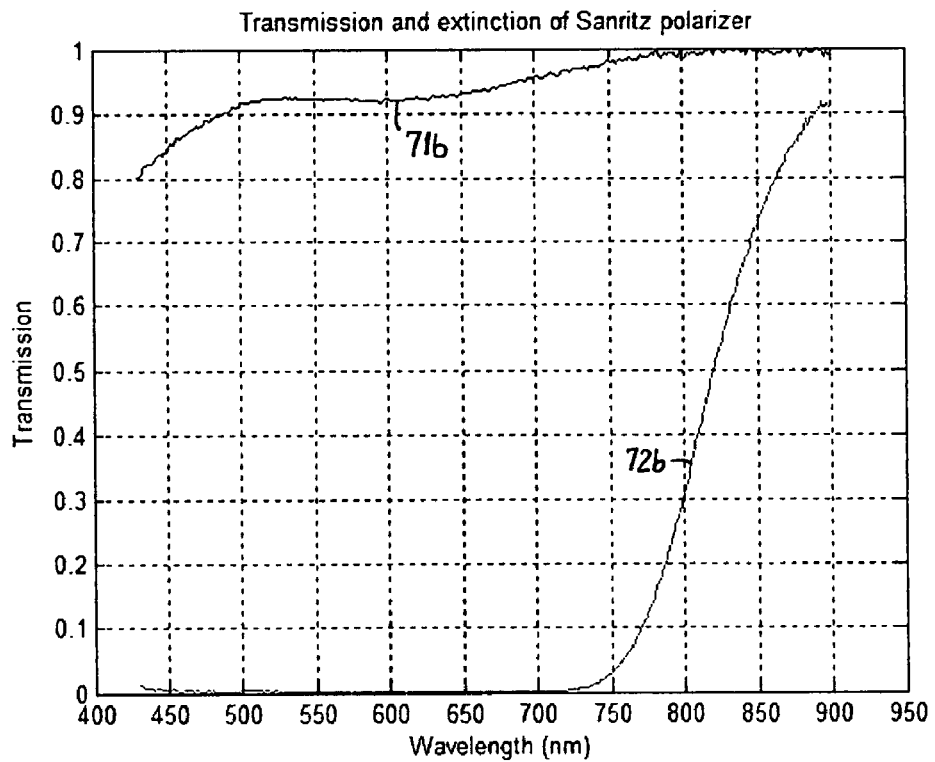
FIG. 7b shows the transmission of Sanritz 5618 polarizer, along the transmission and extinction axes.
Figure 7C:
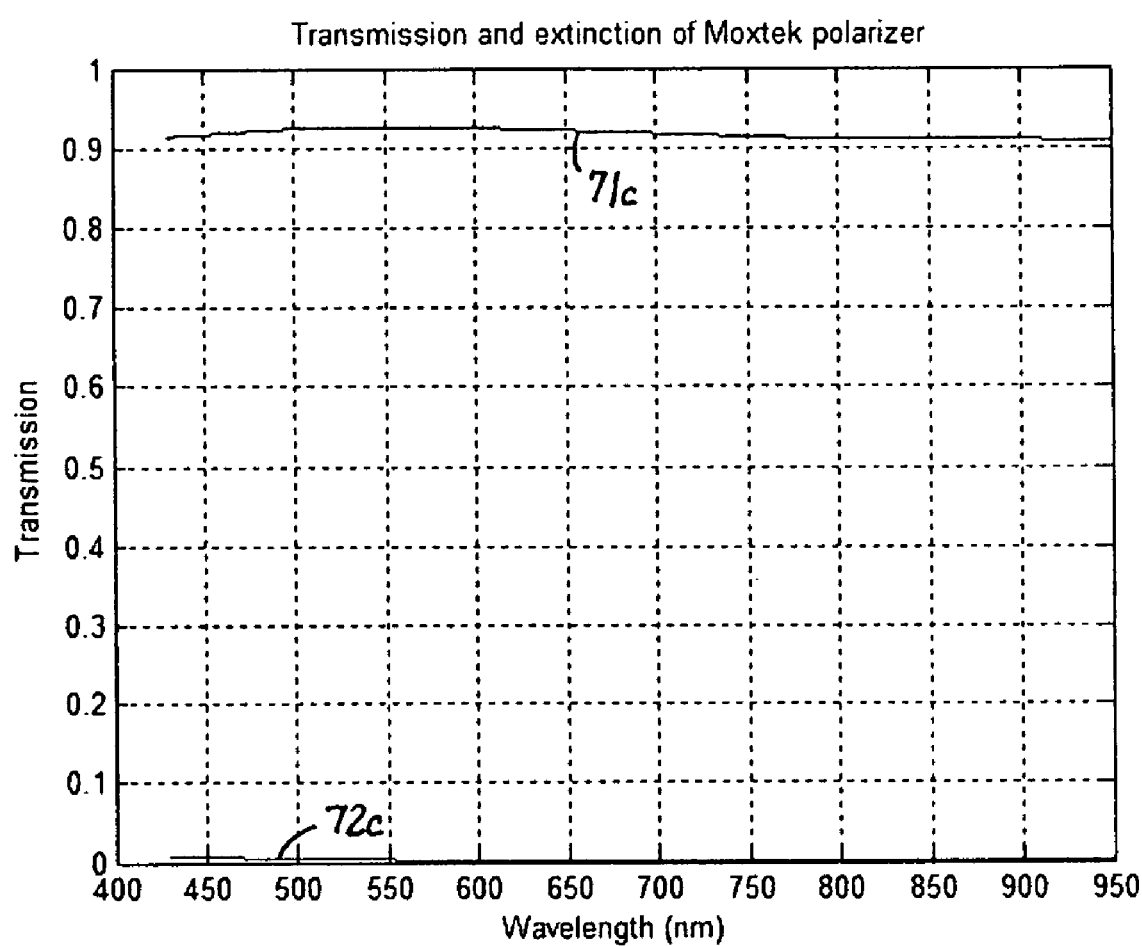
FIG. 7c shows the transmission of Moxtek polarizer material PPL05, along the transmission and extinction axes.

FIGS. 7a-7c show the transmission and extinction of various polarizers, measured using incident light polarized >10,000:1, when the polarizer was oriented with its transmission axis along, and orthogonal to, the incident polarization axis. All polarizers were bonded with index-matching optical adhesive, between a pair of windows. The window faces that formed the outer faces of the assembly had been anti-reflection coated to eliminate Fresnel losses. FIG. 7a shows the transmission of dichroic glass polarizer material from Codixx AG, model number colorPol 650-1100 AC, along the transmission and absorption axes, respectively, as 71a and 72a. FIG. 7b shows the transmission of Sanritz 5618 polarizer, along the transmission and extinction axes, respectively, as 71b and 72b. FIG. 7c shows the transmission of Moxtek polarizer material PPL05, along the transmission and extinction axes, respectively, as 71c and 72c.

While the principles of the invention have been explained using specific examples, the scope of the invention is limited only by the claims attached hereto.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A birefringent optical filter having an optical axis, comprising in series:
   a first reflective polarizer at substantially normal incidence to said optical axis,
   a first birefringent network, and
   an exit polarizer of said first birefringent network including a first dichroic polarizer and a second reflective polarizer at substantially normal incidence to said optical axis, wherein there are no intervening birefringent networks between said first dichroic polarizer and said second reflective polarizer of said exit polarizer on said optical axis, and wherein the first dichroic polarizer is disposed between the second reflective polarizer and the first birefringent network.

2. The filter of claim 1, wherein said first dichroic polarizer is optically directly adjacent to the second reflective polarizer, such that there are no intervening optical elements between said first dichroic polarizer and said second reflective polarizer.

3. The filter of claim 1, wherein said first birefringent network comprises only a single optical retarder.

4. The filter of claim 1, further comprising a second birefringent network disposed between said first birefringent network and said first reflective polarizer.

5. The filter of claim 4, further comprising a second dichroic polarizer disposed between said first birefringent network and said second birefringent network.

6. The filter of claim 1, further comprising a second dichroic polarizer optically adjacent to said first reflective polarizer such that said second dichroic filter and said first reflective polarizer form an input polarizer of said first birefringent network, wherein the second dichroic polarizer is disposed between the first reflective polarizer and the first birefringent network.

7. The filter of claim 1, wherein said first birefringent network comprises a plurality of optical retarders.

8. The filter of claim 1, wherein said polarizers and said birefringent network form a Lyot filter stage.

9. The filter of claim 1, wherein said polarizers and said birefringent network form a Solc filter.

10. The filter of claim 1, wherein said birefringent network comprises a plurality of retarders having selected retarder axis orientations and thicknesses.

11. The filter of claim 10, wherein said retarder axes and thicknesses are chosen to achieve a bandpass with multiple maxima.

12. The filter of claim 10, wherein said retarder axes and thicknesses are chosen to achieve a stopband with multiple minima.

13. The filter of claim 1, further comprising a second birefringent network disposed between said first birefringent network and said first reflective polarizer, a third reflective polarizer at substantially normal incidence to the optical axis, and a second dichroic polarizer, wherein said third reflective polarizer and said second dichroic polarizer together form an exit polarizer for said second birefringent network and an input polarizer for said first birefringent network.

14. The filter of claim 1, further comprising a second birefringent network disposed between said first birefringent network and said first reflective polarizer, a second dichroic polarizer arranged between said first reflective polarizer and said first birefringent network, and a third dichroic polarizer disposed between said first and second birefringent networks, wherein there are no intervening birefringent networks between said first reflective polarizer and said second dichroic polarizer, said first reflective polarizer and said second dichroic polarizer together form an input polarizer for said second birefringent network, and said third dichroic polarizer forms an exit polarizer for said second birefringent network and an input polarizer for said first birefringent network.

* * * * *